(12) United States Patent
Kang

(10) Patent No.: US 10,352,530 B2
(45) Date of Patent: Jul. 16, 2019

(54) LENS, LIGHT EMITTING APPARATUS INCLUDING THE LENS, AND BACKLIGHT UNIT INCLUDING THE APPARATUS

(71) Applicant: LG INNOTEK CO., LTD., Seoul (KR)

(72) Inventor: Lee Im Kang, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 325 days.

(21) Appl. No.: 14/928,273

(22) Filed: Oct. 30, 2015

(65) Prior Publication Data

US 2016/0123554 A1    May 5, 2016

(30) Foreign Application Priority Data

Nov. 3, 2014  (KR) .................. 10-2014-0151002

(51) Int. Cl.
| | |
|---|---|
| *F21V 5/04* | (2006.01) |
| *G02B 3/08* | (2006.01) |
| *G02B 19/00* | (2006.01) |
| *G02F 1/1335* | (2006.01) |

(52) U.S. Cl.
CPC ................ *F21V 5/045* (2013.01); *G02B 3/08* (2013.01); *G02B 19/0028* (2013.01); *G02B 19/0061* (2013.01); *G02F 1/133606* (2013.01); *G02F 1/133603* (2013.01); *G02F 2001/133607* (2013.01)

(58) Field of Classification Search
CPC .......... F21V 5/002; F21V 5/004; F21V 5/005; F21V 5/02; F21V 5/04; F21V 5/045; F21V 5/0091; F21V 5/048; G02B 6/0036; G02B 6/0038; G02B 3/08; G02B 19/0028; G02B 19/0061; G02F 1/133603; G02F 1/133606; G02F 2001/133607
See application file for complete search history.

(56) References Cited

U.S. PATENT DOCUMENTS

| | | | |
|---|---|---|---|
| 2005/0225988 A1 | 10/2005 | Chaves et al. | |
| 2006/0152932 A1 | 7/2006 | Wu | |
| 2008/0074886 A1* | 3/2008 | Chang ................... | F21V 7/0091 362/309 |
| 2008/0144323 A1* | 6/2008 | Chang ..................... | F21V 5/046 362/310 |
| 2010/0195335 A1 | 8/2010 | Allen et al. | |

(Continued)

OTHER PUBLICATIONS

European Search Report dated Mar. 7, 2016 in European Application No. 15192613.6.

*Primary Examiner* — Zheng Song
(74) *Attorney, Agent, or Firm* — Saliwanchik, Lloyd & Eisenschenk

(57) ABSTRACT

A light emitting apparatus is disclosed. The light emitting apparatus includes a light source and a lens located on the light source, wherein the lens includes an upper surface, a lower surface located under the upper surface such that the lower surface is opposite to the light source, and a lateral surface connected between the upper surface and the lower surface, and wherein the lateral surface includes a plurality of segments inclined at different angles, at least one of the segments having a pattern, the pattern having root mean square (RMS) roughness including holes and rods.

20 Claims, 16 Drawing Sheets

(56) References Cited

U.S. PATENT DOCUMENTS

| | | | |
|---|---|---|---|
| 2011/0157898 A1* | 6/2011 | Kanai | F21V 5/04 |
| | | | 362/296.05 |
| 2012/0014115 A1 | 1/2012 | Park et al. | |
| 2012/0081910 A1* | 4/2012 | Saito | F21V 5/04 |
| | | | 362/327 |
| 2013/0088857 A1 | 4/2013 | Lee et al. | |
| 2013/0100679 A1* | 4/2013 | Lin | F21V 5/04 |
| | | | 362/327 |
| 2014/0177229 A1* | 6/2014 | Wang He | F21V 13/04 |
| | | | 362/296.03 |
| 2014/0177235 A1 | 6/2014 | Lin | |
| 2014/0218919 A1* | 8/2014 | Han | F21V 5/04 |
| | | | 362/240 |
| 2014/0226299 A1 | 8/2014 | You et al. | |
| 2015/0268513 A1* | 9/2015 | Chang | G02F 1/133605 |
| | | | 362/97.1 |
| 2016/0033108 A1* | 2/2016 | Ji | H05B 33/0803 |
| | | | 315/297 |
| 2016/0258594 A1* | 9/2016 | Van Kaathoven | |
| | | | G02B 19/0066 |

* cited by examiner

LENS, LIGHT EMITTING APPARATUS INCLUDING THE LENS, AND BACKLIGHT UNIT INCLUDING THE APPARATUS

CROSS REFERENCE TO RELATED APPLICATION

This application claims priority under 35 U.S.C. § 119 to Korean Application No. 10-2014-0151002 filed on Nov. 3, 2014 which is hereby incorporated by reference in its entirety.

TECHNICAL FIELD

Embodiments relate to a lens, a light emitting apparatus including the lens, and a backlight unit including the apparatus.

BACKGROUND

In general, a liquid crystal display (LCD) and a plasma display panel (PDP) have become well known as typical large-sized display apparatuses.

Unlike the PDP, which is self-emissive, the LCD needs a backlight unit since the LCD is not self-emissive.

Based on the position of a light source, the backlight unit may be classified as an edge type backlight unit or a direct type backlight unit. In the edge type backlight unit, a light source is located at the left and right sides and/or the upper and lower sides of an LCD panel, and light is uniformly dispersed over the entire surface of the LCD panel using a light guide plate. As a result, light uniformity is high, and it is possible to remarkably reduce the thickness of the LCD panel.

In the direct type backlight unit, which is generally applied to display apparatuses larger than 20 inches, a plurality of light sources is located under a panel. The direct type backlight unit exhibits higher light efficiency than the edge type backlight unit. For this reason, the direct type backlight unit is mainly used for large-sized display apparatuses in which high luminance is critical.

A cold cathode fluorescent lamp (CCFL) is used as a light source for a conventional edge type or direct type backlight unit. In the backlight unit using the CCFL, however, electric power is constantly supplied to the CCFL, with the result that power consumption is too high. In addition, the CCFL exhibits a color gamut equivalent to about 70% that of a cathode ray tube (CRT). Furthermore, the CCFL causes environmental pollution due to mercury contained in the CCFL.

In recent years, research has been actively conducted into a backlight unit using light emitting diodes (LEDs) as a substitute that is capable of solving the above problems.

In a case in which LEDs are used for the backlight unit, it is necessary to reduce the cost of manufacturing the backlight unit, to reduce power consumption of the backlight unit, and to configure the backlight unit such that the backlight unit is slim.

BRIEF SUMMARY

Embodiments provide a lens, a light emitting apparatus including the lens, and a backlight unit including the apparatus, wherein an increased number of optical paths are provided, whereby the manufacturing cost is reduced, power consumption is reduced, and the backlight unit is slimmed.

In one embodiment, a light emitting apparatus includes a light source and a lens located on the light source, wherein the lens includes an upper surface, a lower surface located under the upper surface such that the lower surface is opposite to the light source, and a lateral surface connected between the upper surface and the lower surface, and wherein the lateral surface includes a plurality of segments inclined at different angles, at least one of the segments having a pattern. The pattern may have root mean square (RMS) roughness. A lower segment connected to the lower surface among the segments may have an RMS roughness greater than 0 μm and less than 60 μm. Alternatively, the pattern may include holes and rods. The holes and the rods may be periodically or non-periodically arranged.

For example, the upper surface may have a recess that becomes gradually deeper toward the light source.

For example, each of the segments may have a width gradually increasing from the lower surface to the upper surface.

For example, one segment close to the lower surface among the segments may have a smaller width than another segment close to the upper surface among the segments.

For example, one segment close to the lower surface among the segments may have a smaller angle of inclination than another segment close to the upper surface among the segments. Alternatively, one segment close to the lower surface among the segments may have a larger angle of inclination than another segment close to the upper surface among the segments.

For example, one segment close to the lower surface among the segments may have larger RMS roughness than another segment close to the upper surface among the segments.

For example, the lower surface of the lens may have an incident surface for allowing light emitted from the light source to be incident thereupon, the upper surface of the lens may have a reflective surface for reflecting the light incident upon the incident surface, and one segment close to the lower surface among the lateral surface of the lens may have a scattering surface for scattering the light reflected by the reflective surface.

For example, the lens may be symmetric or asymmetric with respect to a light axis.

For example, one of the segments close to the lower surface may be parallel to an inclined surface of the recess.

For example, the segments may include a lower segment extending from the lower surface toward the upper surface in a state of being inclined and an upper segment extending from the lower segment toward the upper surface in a state of being inclined.

For example, at least one of the lower or upper segments may be straight or curved.

For example, the light emitting apparatus may further include a cover located on the lens. The cover may include at least one selected from among a transmission plate for transmitting at least some of the light exiting from the lens, a reflection plate for reflecting at least some of the light exiting from the lens, and a diffusion plate for diffusing at least some of light exiting from the lens.

In another embodiment, a backlight unit includes a bottom chassis, a reflection member located on the bottom chassis, at least one light emitting apparatus with the above-stated construction, the light emitting apparatus being located on the reflection member, and an optical sheet located on the light emitting apparatus in a state of being supported by the bottom chassis.

In a further embodiment, a lens includes an upper surface, a lower surface located under the upper surface such that the lower surface is opposite to the light source, and a lateral surface connected between the upper surface and the lower surface, wherein the lateral surface includes a plurality of segments inclined at different angles, at least one of the segments having a pattern. The pattern may have RMS roughness.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
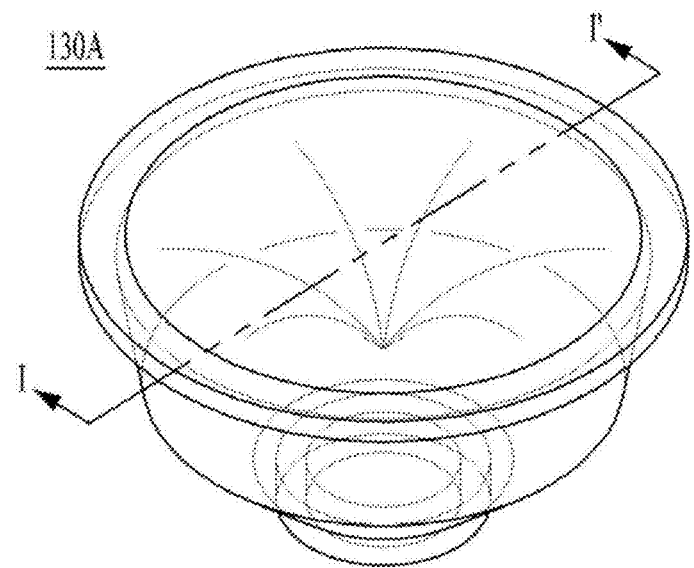
FIG. 1 is a perspective view showing a lens according to an embodiment.

Reference will now be made in detail to the preferred embodiments, examples of which are illustrated in the accompanying drawings. However, embodiments may be modified into various other forms. Embodiments are not restrictive but are illustrative. Embodiments are provided to more completely explain the disclosure to a person having ordinary skill in the art.

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

In addition, relational terms, such as 'first' and 'second' and 'upper part' and 'lower part', are used only to distinguish between one subject or element and another subject and element without necessarily requiring or involving any physical or logical relationship or sequence between such subjects or elements.

In the drawings, the thicknesses or sizes of respective layers (or respective parts) are exaggerated, omitted, or schematically illustrated for convenience and clarity of description. Further, the sizes of the respective elements do not denote the actual sizes thereof.

FIG. 1 is a perspective view showing a lens 130A according to an embodiment.

Figure 2:
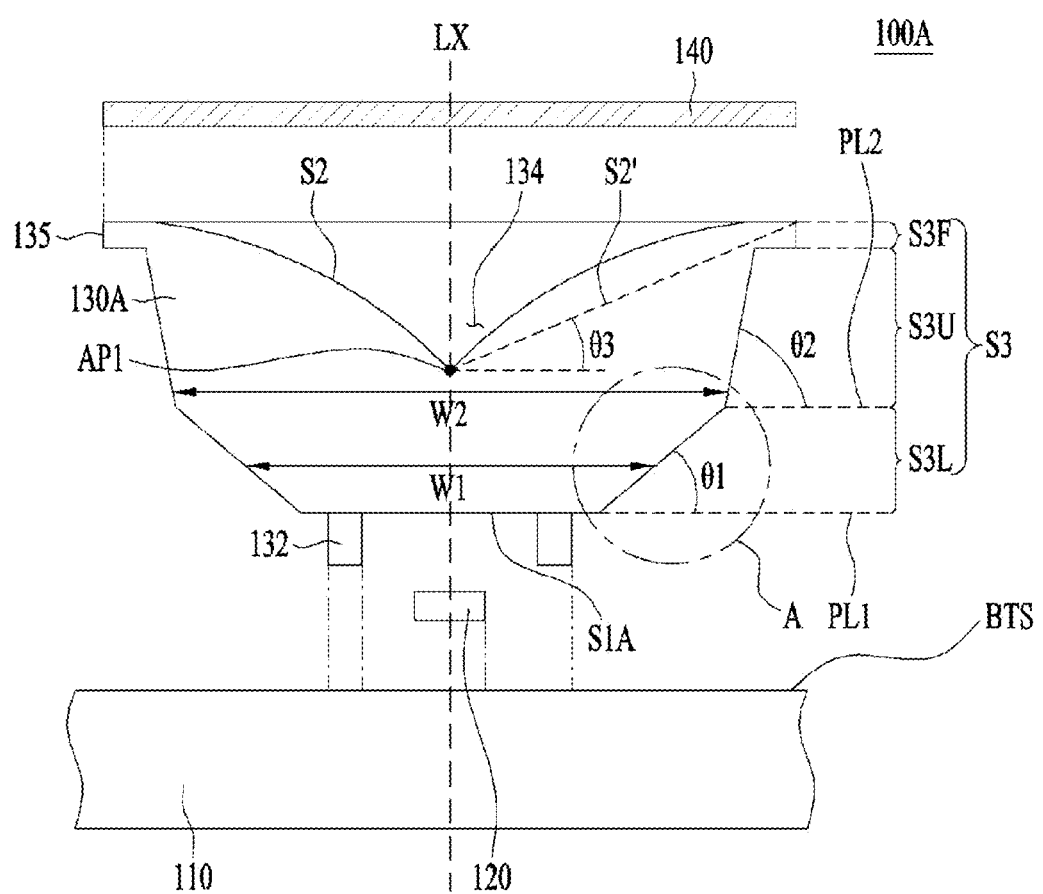
FIG. 2 is an exploded sectional view showing a light emitting apparatus according to an embodiment.
Figure 3:
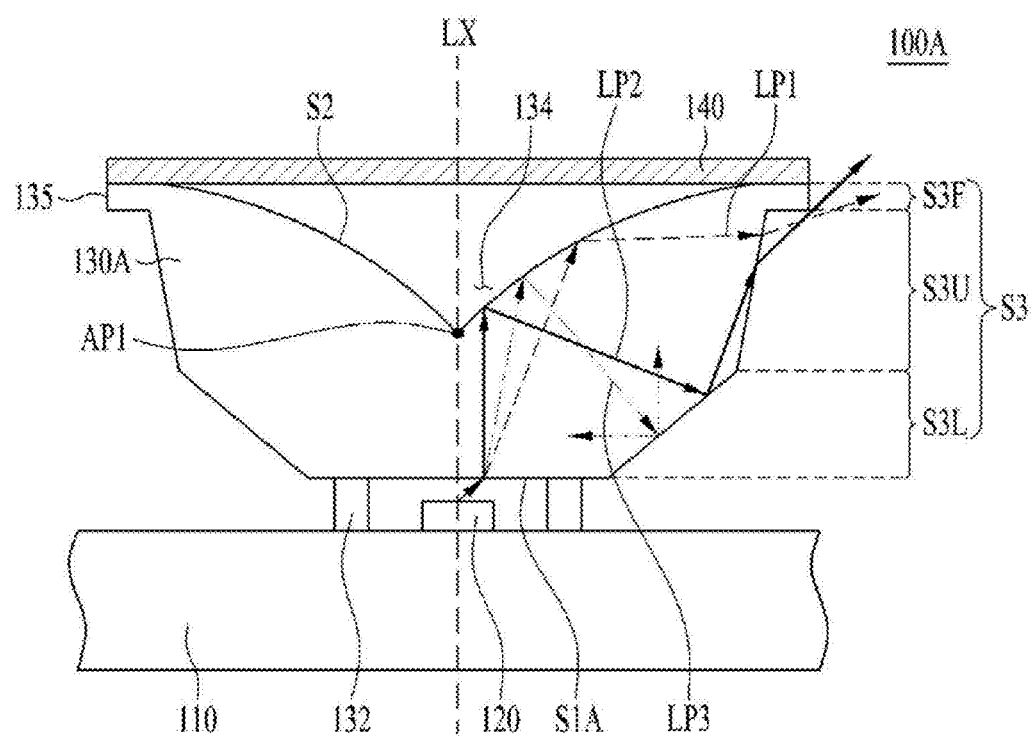
FIG. 3 is an assembled sectional view of the light emitting apparatus shown in FIG. 2.

FIG. 2 is an exploded sectional view showing a light emitting apparatus (or a light source module) 100A according to an embodiment, and FIG. 3 is an assembled sectional view of the light emitting apparatus 100A shown in FIG. 2.

FIGS. 2 and 3 are sectional views taken along line I-I' of FIG. 1.

Referring to FIGS. 2 and 3, the light emitting apparatus 100A according to the embodiment may include a base 110, a light source 120, a lens 130A, and a cover 140.

The light source 120 may be located on the base 110. The base 110 may be a plate-shaped drive board. However, the disclosure is not limited thereto. At least one light source 120 may be mounted on the base 110, and an electrode pattern for connecting the light source 120 with an adaptor for supplying electric power may be formed on the base 110.

For example, a carbon nanotube electrode pattern for connecting the light source 120 with the adaptor may be formed on the upper surface of the base 110. The base 110 may be a printed circuit board (PCB), made of polyethylene terephthalate (PET), glass, polycarbonate (PC), or silicon (Si), on which a plurality of light sources is mounted. The base 110 may be formed to have a film shape. In addition, a single-layer PCB, a multiple-layer PCB, a ceramic board, or a metal core PCB may be selectively used as the base 110.

The light source 120 may receive an electrical signal from the circuit pattern of the base 110, may convert the received electrical signal into an optical signal, and may output the optical signal. The light source 120 may be a point light source or a surface light source. However, the disclosure is not limited thereto.

The light source 120 may be a light emitting diode (LED) chip. The LED chip may be a blue LED chip or an ultraviolet LED chip. Alternatively, the LED chip may be at least one selected from a red LED chip, a green LED chip, a blue LED chip, a yellow green LED chip, and a white LED chip or a combination thereof.

A white LED may be embodied by applying a yellow phosphor to a blue LED, by applying a red phosphor and a green phosphor to a blue LED, or by applying a yellow phosphor, a red phosphor, and a green phosphor to a blue LED.

The lens 130A is located on the light source 120 to improve the uniformity in luminance of light emitted from the light source 120. The lens 130A may include a lower surface S1A, an upper surface S2, and a lateral surface S3.

The lower surface S1A of the lens 130A is located under the upper surface S2. The lower surface S1A may be opposite to the light source 120. The lower surface S1A may have an incidence surface, upon which light emitted from the light source is incident. The lower surface S1A may include a spherical surface or an aspherical surface. In FIGS. 2 and 3, the sectional shape of the lower surface S1A is shown as a straight line. However, the disclosure is not limited thereto. In another embodiment, the sectional shape of the lower surface S1A may be a curved line rather than the straight line.

The upper surface S2 of the lens 130A may have a first recess 134 that becomes sunken toward the light source 120. In the upper surface S2 having the first recess 134, the degree of slope of the recess gradually increases from the edge of the lens 130A to a light axis LX.

The light axis LX may be a virtual straight line indicating a direction in which light advances along the center of luminous flux emitted from the point light source 120. In FIGS. 2 and 3, the light axis LX may coincide with a virtual axis connecting the center of the upper surface S2 of the lens 130A, the center of the lower surface S1A of the lens 130A, and the center of the point light source 120.

The upper surface S2 of the lens 130A may have at least one of a reflective surface or a refractive surface. Here, the reflective surface reflects light incident upon the incident surface (hereinafter, denoted by S1A) of the lower surface S1A and a refractive surface refracts light incident upon the incident surface S1A. Light reflected by the upper surface S2 may be directed to the lateral surface S3. According to circumstances, light that is incident upon the incident surface S1A in a refracted state may exit through the upper surface S2. In addition, the first recess 134 may be symmetric (or rotationally symmetric) or asymmetric (or rotationally asymmetric) with respect to the light axis LX.

In addition, as shown in FIGS. 2 and 3, the upper surface S2 may have a predetermined curvature. However, the disclosure is not limited thereto. In another embodiment, the sectional shape of the upper surface S2 may be a straight line S2'.

The lateral surface S3 of the lens 130A interconnects the upper surface S2 and the lower surface S1A. The lateral surface S3 may include segments S3L, S3U, and S3F, which are inclined at different angles. In FIGS. 2 and 3, three segments are shown. In another embodiment, the lateral surface S3 of the lens 130A may include more than three segments or less than three segments.

Referring to FIGS. 2 and 3, the lower segment S3L may be a lateral surface extending from the lower surface S1A toward the upper surface S2 of the lens 130A in a state of being inclined at a first angle $\theta 1$. The first angle $\theta 1$ may be an angle at which the lateral surface of the lower segment S3L is inclined with respect to a virtual first horizontal plane PL extending from the lower surface S1A. That is, of the segments S3L, S3U, and S3F, the lower segment S3L may be a segment that is the closest to the lower surface S1A.

The upper segment S3U may be the lateral surface extending from the lower segment S3L toward the upper surface S2 in a state of being inclined at a second angle $\theta 2$. The second angle $\theta 2$ may be an angle at which the lateral surface of the upper segment S3U is inclined with respect to a virtual second horizontal plane that extends from a boundary between the lower segment S3L and the upper segment S3U and is parallel to the virtual first horizontal plane. That is, of the segments S3L, S3U, and S3F, the upper segment S3U may be a segment that is the closest to the upper surface S2.

In another embodiment, although not shown in FIGS. 2 and 3, at least one center segment S3C may be additionally located between the upper segment S3U and the lower segment S3L.

In addition, the first angle $\theta 1$ and the second angle $\theta 2$ may be different from each other. The first and second angles $\theta 1$ and $\theta 2$ may differ depending upon the requirements of the lens 130A. For example, the first angle $\theta 1$ may be greater than 0 degrees and less than 90 degrees, and the second angle $\theta 2$ may be greater than 0 degrees and less than 180 degrees.

In this embodiment, as shown in FIGS. 2 and 3, the first angle $\theta 1$ may be less than the second angle $\theta 2$. However, the disclosure is not limited thereto. In another embodiment, the first angle $\theta 1$ may be greater than the second angle $\theta 2$.

For example, in a case in which a ratio of the first angle $\theta 1$ to the second angle $\theta 2$, i.e. an angle ratio $\theta 1/\theta 2$, is less than 0.2, a clear aperture of the lower surface S1A may be blocked. In a case in which the angle ratio $\theta 1/\theta 2$ is greater than 0.8, illumination distribution of the lens 130A may greatly deviate from a normal distribution. For these reasons, the angle ratio $\theta 1/\theta 2$ may range from 0.2 to 0.8. However, the disclosure is not limited thereto.

For example, in a case in which the second angle $\theta 2$ is greater than the first angle $\theta 1$, if the second angle $\theta 2$ is less than the average value of the angles of inclination of the upper surface S2, e.g. 45 degrees, the width of the lower surface S1A may be reduced with the result that the area upon which light is incident may be reduced. If the second angle $\theta 2$ is greater than 90 degrees, it may be difficult to form the lens 130A by injection molding. For these reasons, the second angle $\theta 2$ may be 45 degrees to 90 degrees. However, the disclosure is not limited thereto.

In addition, first and second widths W1 and W2 of the lower and upper segments S3L and S3U may gradually increase, may gradually decrease, or may be uniform, from the lower surface S1A to the upper surface S2.

That is, in this embodiment, as shown in FIGS. 2 and 3, the first and second widths W1 and W2 may gradually increase from the lower surface S1A to the upper surface S2.

In another embodiment, unlike what is shown in FIGS. 2 and 3, the first and second widths W1 and W2 of the lower and upper segments S3L and S3U may decrease from the lower surface S1A to the upper surface S2.

In another embodiment, unlike what is shown in FIGS. 2 and 3, the first width W1 may gradually increase from the lower surface S1A to the upper surface S2, and the second width W2 may be uniform from the lower surface S1A to the upper surface S2.

In addition, the first width W1 of the lower segment S3L that is close to the lower surface S1A may be less than the second width W2 of the upper segment S3U that is close to the upper surface S2.

In addition, as shown in FIGS. 2 and 3, the lateral sectional shape of at least one of the lower and upper segments S3L and S3U may be a straight line. However, the disclosure is not limited thereto. In another embodiment, the lateral sectional shape of at least one of the lower and upper segments S3L and S3U may be a curved line.

In addition, in this embodiment, as shown in FIGS. 2 and 3, the lens 130A may be symmetric (or rotationally symmetric) with respect to the light axis LX. However, the disclosure is not limited thereto. In another embodiment, the lens 130A may be asymmetric (or rotationally asymmetric) with respect to the light axis LX.

If the upper surface S2' is a straight line inclined at a third angle $\theta 3$, the inclined first angle $\theta 1$ of one of the segments S3L, S3U, and S3F, e.g. the lower segment S3L that is close to the lower surface S1A, may be equal to or different from the third angle $\theta 3$. In a case in which the first angle $\theta 1$ and the third angle $\theta 3$ are equal to each other, the lower segment S3L may be parallel to the upper surface S2.

Meanwhile, at least one of the segments S3L, S3U, or S3F, which constitute the lateral surface S3, may have a pattern suitable for scattering light. Hereinafter, in FIGS. 2 and 3, the lower segment S3L will be described as having a pattern suitable for scattering light for the convenience of description. However, the following description will also be applied to a case in which the upper segment S3U has a pattern. That is, the lower segment S3L may have a scattering surface for scattering light that is reflected by the upper surface S2 and is then directed to the lower side of the lens 130A.

Figure 4A:
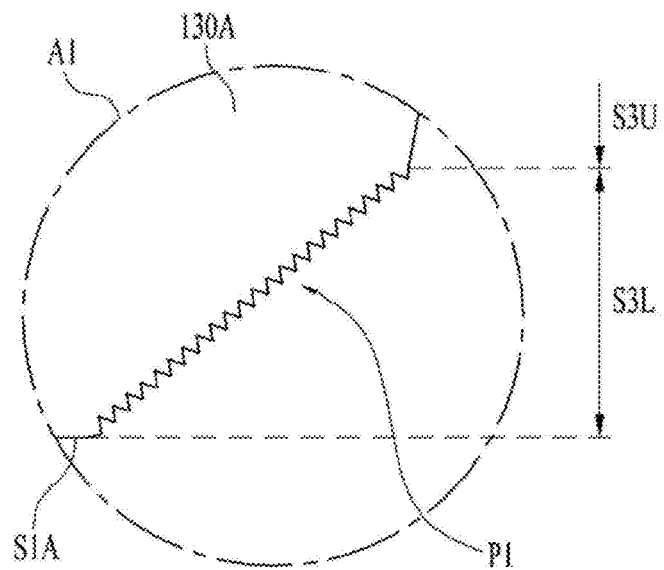
FIGS. 4A to 4C are enlarged partial sectional views showing embodiments of part 'A' shown in FIG. 2.
Figure 4B:
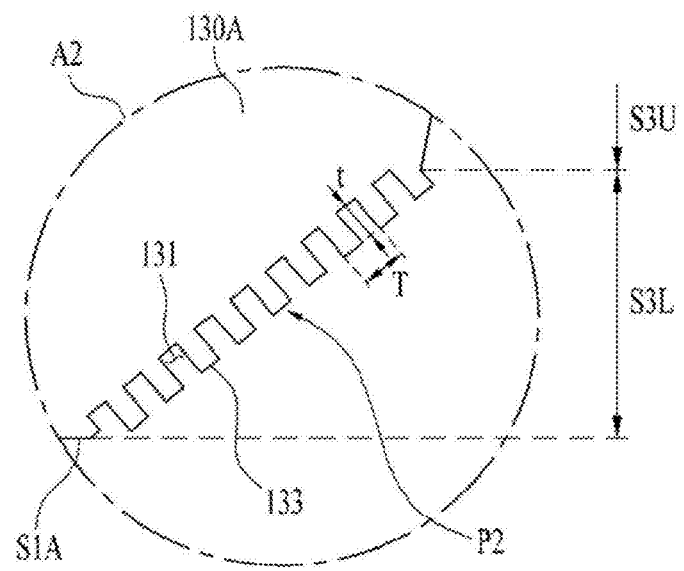
Figure 4C:
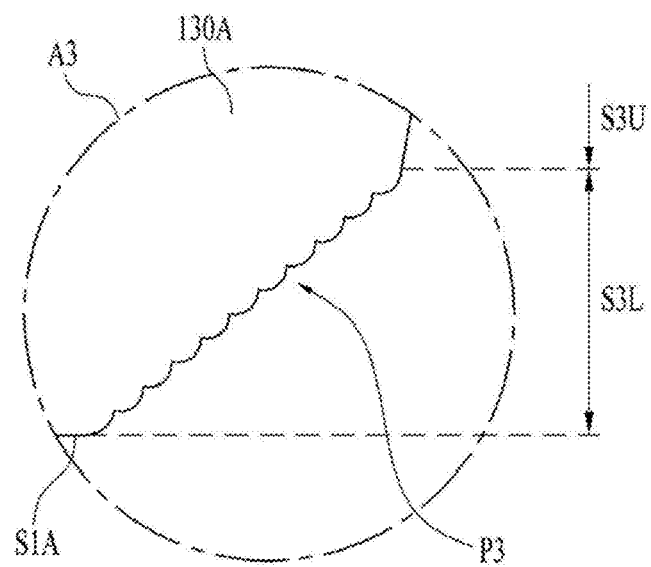

FIGS. 4A to 4C are enlarged partial sectional views showing embodiments A1, A2, and A3 of part 'A' shown in FIG. 2.

In one embodiment, as shown in FIG. 4A, the lower segment S3L of the lens 130A may have a pattern P1 including root mean square (RMS) roughness. For example, the RMS roughness of the lower segment S3L may be greater than 0 μm and less than 60 μm. However, the disclosure is not limited thereto.

In addition, in a case in which the upper segment S3U also has RMS roughness, as shown in FIG. 4A, in addition to the lower segment S3L, the RMS roughness of the lower segment S3L may be greater than or less than the RMS roughness of the upper segment S3U. In this case, the RMS roughness of at least one of the lower or upper segments S3L or S3U may be suitable for scattering light.

In another embodiment, as shown in FIG. 4B, the lower segment S3L of the lens 130A may have a pattern P2 including holes 131 and rods 133. For example, as shown in FIG. 4B, the holes 131 and the rods 133 may be periodically arranged at an interval T. Alternatively, the holes 131 and the rods 133 may be non-periodically arranged.

In FIG. 4B, the pattern of the lower segment S3L is shown as having a quadrangular sectional shape. However, the disclosure is not limited thereto. In another embodiment, as shown in FIG. 4C, the lower segment S3L of the lens 130A may have a semicircular sectional shape pattern P3. However, the disclosure is not limited thereto. In another embodiment, the lower segment S3L of the lens 130A may have a polygonal sectional shape pattern, such as a triangular sectional shape pattern, in addition to the quadrangular sectional shape pattern.

Referring back to FIGS. 2 and 3, the cover 140 may be located on the lens 130A in order to cover a portion of the lens 130A including a central portion of the lens 130A. To this end, the cover 140 may absorb, transmit, reflect, diffuse, or refract at least some of the light passing through the lens 130A. If the cover 140 is not provided, most of the light exiting through the upper surface S2 of the lens 130A advances to a central portion of the light emitting apparatus 100A. As a result, a Mura phenomenon, in which the center of the light emitting apparatus 100A becomes very bright, may occur. Consequently, the cover 140 may transmit only some of the light passing through the upper surface S2 of the lens 130A in order to prevent the occurrence of a phenomenon in which light to be emitted is concentrated on the central portion of the light emitting apparatus 100A, i.e. a Mura phenomenon.

For example, the cover 140 may be at least one selected from among a transmission plate, a reflection plate, and a diffusion plate. The transmission plate serves to transmit at least some of the light exiting from the lens 130A, the reflection plate serves to reflect at least some of the light exiting from the lens 130A, and the diffusion plate serves to diffuse at least some of the light exiting from the lens 130A.

The cover 140 may have a light transmissivity of 70% or less. However, the disclosure is not limited thereto. For example, the cover 140 may be made of an acrylic resin such as polymethyl metacrylate (PMMA), polyethylene terephthalate (PET), polycarbonate (PC), cycloolefin copolymer (COC), or polyethylene naphthalate (PEN).

In addition, the lens 130A may further include a flange 135 extending from the upper surface S2 in a direction intersecting the light axis LX (e.g. a direction perpendicular to the light axis LX) in order to support the cover 140. The flange 135 has a lateral surface corresponding to the flange segment S3F, which is one of the segments S3L, S3U, and S3F.

The surfaces of the lens 130A and the cover 140 which face each other may be partially bonded to each other by an adhesive member (not shown), such as a sheet or a film made of polyimide glass fiber containing epoxy.

According to circumstances, the cover 140 and the flange 135 may be omitted. However, the disclosure is not limited thereto.

In addition, as shown in FIGS. 2 and 3, the light emitting apparatus 100A may include a support member 132. The support member 132 may protrude from the lower surface S1A of the lens 130A toward a top surface BTS of the base 110. Referring to FIG. 3, the support member 132 serves to support the lens 130A on the base 110. The support member 132 may be integrated into the lens 130A. That is, the support member 132 may be part of the lens 130A. Alternatively, the support member 132 may be attached to, bonded to, coupled to, inserted into, or fixed to the lens 130A using an adhesive.

In another embodiment, unlike what is shown in FIGS. 2 and 3, the base 110 may be provided at the upper part thereof with a blind hole (not shown), into which the support member 132 may be inserted.

Figure 5:
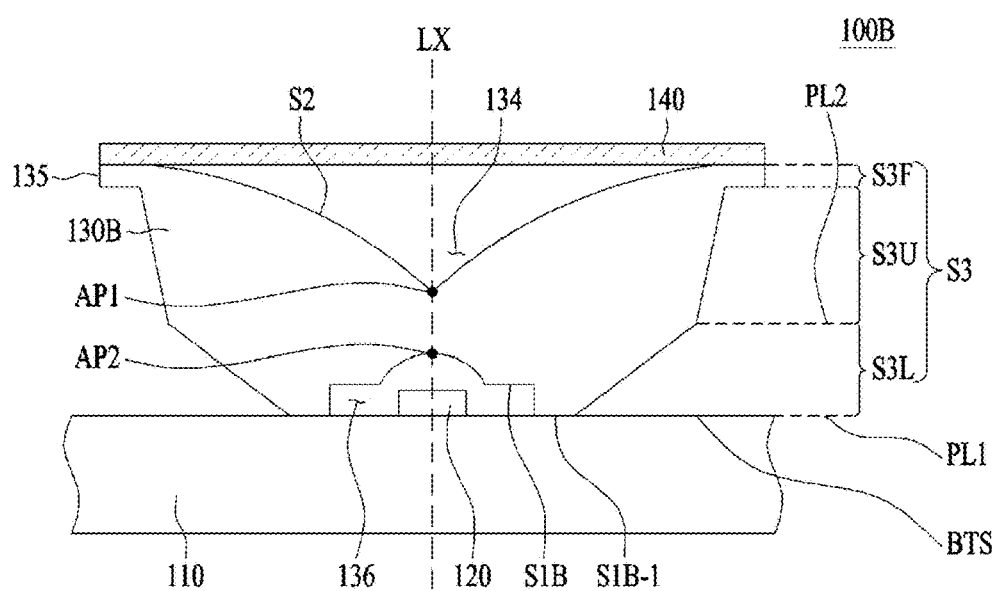
FIG. 5 is a sectional view showing a light emitting apparatus according to another embodiment.

FIG. 5 is a sectional view showing a light emitting apparatus 100B according to another embodiment.

In the light emitting apparatus 100A shown in FIGS. 2 and 3, the lower surface S1A of the lens 130A is flat, and the light source 120 is spaced apart from the lower surface S1A by a predetermined distance. However, the disclosure is not limited thereto.

In another embodiment, as shown in FIG. 5, a lower surface S1B of a lens 130B may have a second recess 136, and a light source 120 may be located between the lower surface S1B of the lens 130B and a top surface BTS of a base 110 in the second recess 136. The other constructions of the light emitting apparatus 100B shown in FIG. 5 except for the above difference features are identical to those of the light emitting apparatus 100A shown in FIG. 3, and therefore a repetitive description thereof will be omitted.

In the light emitting apparatus 100B shown in FIG. 5, the entirety of the light source 120 is buried in the second recess 136. In another embodiment, only a portion of the light source 120 may be buried in the second recess 136.

In addition, the light emitting apparatus 100B shown in FIG. 5 does not include a support member 132, unlike the light emitting apparatus 100A shown in FIG. 3. This is because a bottom surface S1B-1 of the lens 130B may be located on the base 110 since the second recess 136 is formed in the lower part of the lens 130B.

In FIGS. 2, 3, and 5, the lowest point AP1 of the first recess 134, which is formed by the upper surface S2, may be located on the light axis LX. However, the disclosure is not limited thereto. In addition, in FIG. 5, the lowest point AP1 of the first recess 134, which is formed by the upper surface S2, and the highest point AP2 of the second recess 136, which is formed by the lower surface SIB, may be located on the light axis LX. However, the disclosure is not limited thereto.

In another embodiment, unlike what is shown in FIGS. 2, 3, and 5, the light source 120 may be an integrated optical lens (IOL) type light source buried in the lower part of the lens 130A or 130B.

The lens 130A or 130B may also be applied to light emitting apparatuses having constructions different from those of the light emitting apparatus 100A or 100B shown in FIG. 2, 3, or 5.

The light emitting apparatus 100A or 100B is shown as including a single light source 120. However, the disclosure is not limited thereto. In another embodiment, the light emitting apparatus may include a plurality of light sources 120 arranged on the base 110 while being spaced apart from each other.

In addition, the light emitting apparatus 100A or 100B may be applied to various fields. For example, the light emitting apparatus 100A or 100B may be applied to a display apparatus, an indicator, or a lighting apparatus. In addition, the light emitting apparatus 100A or 100B may be applied to a backlight unit. The lighting apparatus may include a lamp or a streetlight.

In addition, a backlight unit 200, to which the light emitting apparatus 100A or 100B is applied, may be applied to a liquid crystal display (LCD) 300.

Hereinafter, an example of a backlight unit 200 including the light emitting apparatus 100A shown in FIGS. 2 and 3 and an example of an LCD 300 including the backlight unit 200 will be described with reference to the accompanying drawings. However, the disclosure is not limited thereto. In addition, the following description may also be applied to a case in which the backlight unit 200 and the LCD 300 include the light emitting apparatus 100B shown in FIG. 5 in place of the light emitting apparatus 100A shown in FIGS. 2 and 3.

Figure 6:
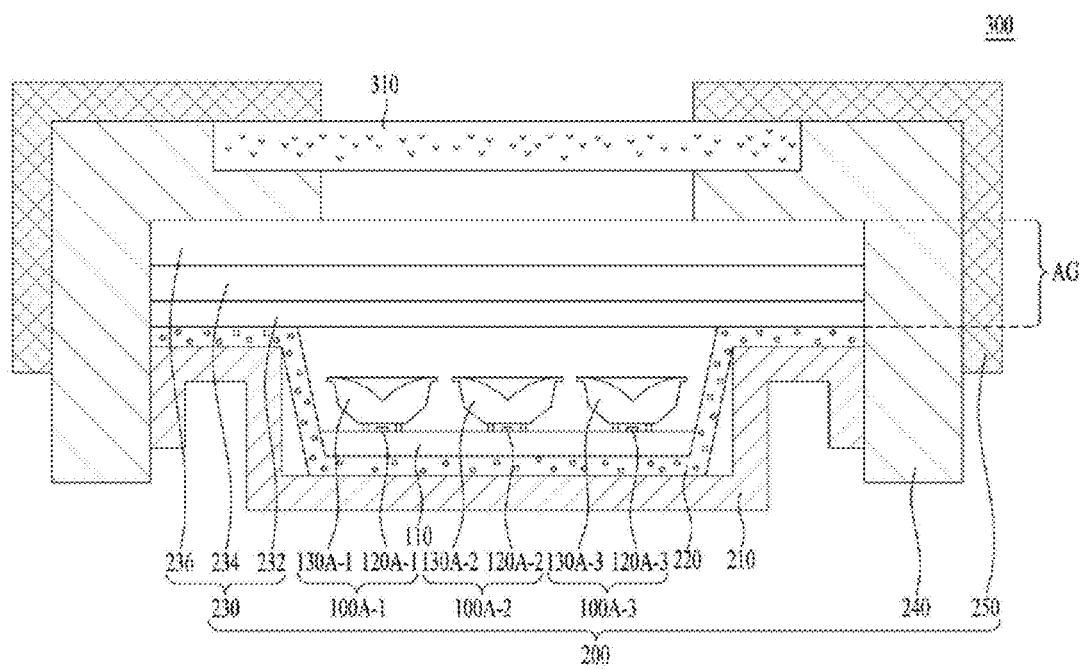
FIG. 6 is a sectional view showing a liquid crystal display according to an embodiment.

FIG. 6 is a sectional view showing an LCD 300 according to an embodiment.

Referring to FIG. 6, the LCD 300 may include a backlight unit 200 and a liquid crystal panel 310.

The backlight unit 200 includes a bottom chassis 210, a reflection member 220, an optical sheet 230, a frame 240, a top chassis 250, and light emitting apparatuses 100A-1, 100A-2, and 100A-3.

The light emitting apparatuses 100A-1, 100A-2, and 100A-3 may include a base 110, light sources 120A-1, 120A-2, and 120A-3, and lenses 130A-1, 130A-2, and 130A-3.

Three light sources 120A-1, 120A-2, and 120A-3 are arranged on a single base 110. However, the disclosure is not limited thereto. In another embodiment, more than or less than three light sources may be arranged on a single base 110. The three light sources 120A-1, 120A-2, and 120A-3 jointly have a single base 110. However, the disclosure is not limited thereto.

The base 110 shown in FIG. 6 corresponds to the base 110 shown in FIGS. 2 and 3, and each of the light sources 120A-1, 120A-2, and 120A-3 corresponds to the light source 120 shown in FIGS. 2 and 3, and therefore a repetitive description thereof will be omitted. Unlike the light emitting apparatus 100A shown in FIGS. 2 and 3, the light emitting apparatuses 100A-1, 100A-2, and 100A-3 shown in FIG. 6 may not include a cover 140.

Based on the position of the light emitting apparatus, the backlight unit 200 may be classified as an edge type backlight unit or a direct type backlight unit. In the edge type backlight unit 200, light emitting diodes constituting the light source 120 of the light emitting apparatus are arranged at the side of an air gap AG.

On the other hand, as shown in FIG. 6, in the direct type backlight unit, the light emitting apparatuses 100A-1, 100A-2, and 100A-3, which include light sources 120A-1, 120A-2, and 120A-3, are arranged at the rear of the liquid crystal panel 310 (i.e. under the liquid crystal panel 310). Consequently, the light emitting apparatuses 100A-1, 100A-2, and 100A-3 may emit light toward the rear of the liquid crystal panel 310.

The bottom chassis 210 may be made of metal or the like. The bottom chassis 210 may be formed in a box shape that is open at the upper part thereof. For example, the bottom chassis 210 may be formed by bending or curving a metal plate. The bottom chassis 210 may serve to support the reflection member 220 and the optical sheet 230. A portion of the reflection member 220 and the light emitting apparatuses 100A-1, 100A-2, and 100A-3 may be received in the bent or curved space of the bottom chassis 210.

The reflection member 220 serves to reflect light emitted from the light emitting apparatuses 100A-1, 100A-2, and 100A-3 in order to improve the performance of the backlight unit 200. In a case in which the entire surface of the bottom chassis 210 is coated with a material exhibiting high reflexibility, the reflection member 220 may be omitted.

The optical sheet 230 may be located on the light emitting apparatuses 100A-1, 100A-2, and 100A-3 in a state of being supported by the bottom chassis 210. The optical sheet 230 may include at least one selected from among a diffusion sheet 232, a polarization sheet 234, and a prism sheet 236.

The diffusion sheet 232 serves to widely diffuse light emitted from the light emitting apparatuses 100A-1, 100A-2, and 100A-3 upward. The polarization sheet 234 serves to allow light emitted from the light emitting apparatuses 100A-1, 100A-2, and 100A-3 to be incident thereupon and to polarize an obliquely incident component of the incident light such that the obliquely incident light component exits perpendicularly. The prism sheet 236 serves to transmit light parallel to a transmission axis thereof and to reflect light perpendicular to the transmission axis thereof.

As shown, an air gap AG may be located between the optical sheet 230 and the light emitting apparatuses 100A-1, 100A-2, and 100A-3 in place of a light guide plate. Light emitted from the light emitting apparatuses 100A-1, 100A-2, and 100A-3 may be directed to the optical sheet 230 through the air gap AG, or may be laterally emitted, reflected by the reflection member 220, and directed to the optical sheet 230 through the air gap AG.

The frame 240 supports the top chassis 250 and the liquid crystal panel 310.

The LCD 300 shown in FIG. 6 is not self-emissive. For this reason, the backlight unit 200 may provide light to the rear of the liquid crystal panel 310, on which an image is displayed. The liquid crystal panel 310 is a display unit of the LCD 300. The liquid crystal panel 310 may include a thin film transistor (TFT) substrate, a color filter substrate, and a liquid crystal layer interposed therebetween. The TFT substrate may include a plurality of gate lines, a plurality of data lines intersecting the gate lines, and TFTs located at intersections of the gate lines and the data lines. Although not shown, a driving unit may be further located under the liquid crystal panel 310. The driving unit may include a first printed circuit board (not shown) for supplying a scanning signal to the gate lines of the TFT substrate of the liquid crystal panel 310 and a second printed circuit board (not shown) for supplying a data signal to the data lines. The driving unit may be electrically connected to the liquid crystal panel 310 in a chip on film (COF) or tape carrier package (TCP) fashion.

The top chassis 250 may be coupled to the frame 240, which surrounds the edge of the liquid crystal panel 310. However, the disclosure is not limited thereto. The backlight unit 200 may have various structures other than what is shown in FIG. 6. In addition, the liquid crystal panel 310 may be coupled to the backlight unit 200 in various fashions other than what is shown in FIG. 6.

Hereinafter, the features of the lenses 130A and 130B, the light emitting apparatuses 100A and 100B, the backlight unit 200, and the LCD 300 according to the embodiment will be described. The light emitting apparatuses 100A shown in FIGS. 2 and 3 will be described. However, the following description will also be applied to the light emitting apparatuses 100B shown in FIG. 5.

In a case in which the lateral surface S3 of the lens 130A does not include the lower segment S3L but includes only the upper segment S3U, unlike what is shown in FIG. 3, i.e. in a case in which the lower surface S1A and the upper surface S2 of the lens 130A are connected to each other via only the upper segment S3U, light emitted from the light source 120 may exit from the lens 130A along a first path LP1. The first path LP1 may be configured as follows. Light emitted from the light source 120 is incident upon the lower surface S1A of the lens 130A, and is then refracted by the lower surface S1A. The light, refracted by the lower surface S1A, is reflected by the upper surface S2, is incident upon the upper segment S3U, and is refracted by the upper segment S3U, and then exits from the lens 130A.

On the other hand, in a case in which the lateral surface S3 of the lens 130A includes the lower segment S3L as well as the upper segment S3U, as shown in FIG. 3, light emitted from the light source 120 may exit from the lens 130A along a second path LP2 as well as the first path LP1. The second path LP2 may be configured as follows. Light emitted from the light source 120 is incident upon the lower surface S1A, and is then refracted by the lower surface S1A. The light, refracted by the lower surface S1A, is reflected by the upper surface S2, is incident upon the lower segment S3L, is reflected by the lower segment S3L, is directed to the upper segment S3U, is refracted by the upper segment S3U, and then exits from the lens 130A.

Figure 7A:
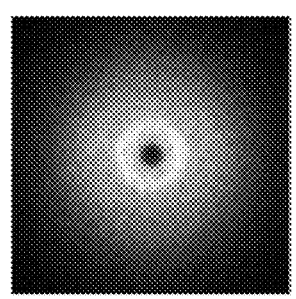
FIGS. 7A and 7B are plan views showing examples in which light exits from a lens along a first path and a second path.
Figure 7B:
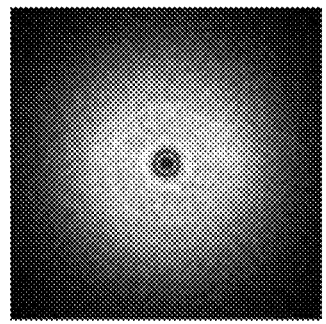

FIGS. 7A and 7B are plan views showing examples in which light exits from the lens 130A along the first path LP1 and the second path LP2.

In a case in which light exits along the first path LP1, as shown in FIG. 7A, illumination distribution may not be uniform. On the other hand, in a case in which light exits along the second path LP2 as well as the first path LP1, as shown in FIG. 7B, illumination distribution may be relatively more uniform than that shown in FIG. 7A.

In addition, in a case in which the lateral surface S3 of the lens 130A includes the lower segment S3L as well as the upper segment S3U, and the lower segment S3L has a RMS roughness as pattern, light emitted from the light source 120 may be scattered along a third path LP3 as well as the first and second paths LP1 and LP2, and may then exit from the lens 130A. Referring to FIG. 3, the third path LP3 may be configured as follows. Light emitted from the light source 120 is incident upon the lower surface S1A, and is then refracted by the lower surface S1A. The light, refracted by the lower surface S1A, is reflected by the upper surface S2. The light, reflected by the upper surface S2, is incident upon the lower segment S3L, and is then scattered by the lower segment S3L. Since light is scattered by the lower segment S3L, much more light may exit from the lens 130A.

Hereinafter, the features of a light emitting apparatus according to a comparative example including lower and upper segments S3L and S3U, wherein the lower segment S3L does not have RMS roughness as pattern, and a light emitting apparatus according to an embodiment including lower and upper segments S3L and S3U, wherein the lower segment S3L has RMS roughness as pattern, will be described based on a comparison therebetween with reference to the accompanying drawings.

Figure 8A:
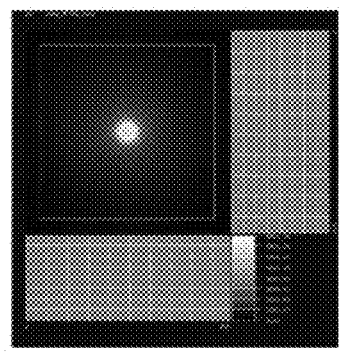
FIGS. 8A to 8C, 9A to 9C, and 10A to 10C are views showing Mura levels and luminance distributions of a light emitting apparatus according to a comparative example and a light emitting apparatus according to an embodiment under different conditions.
Figure 8B:
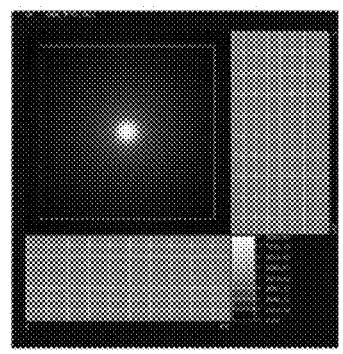
Figure 8C:
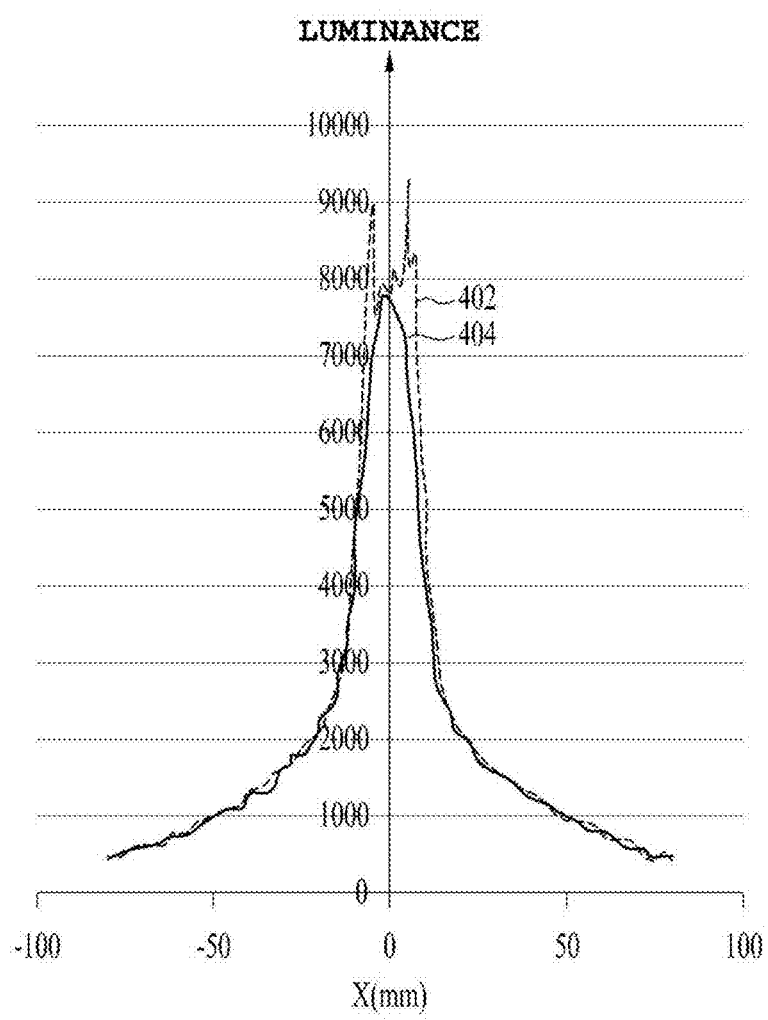
Figure 9A:
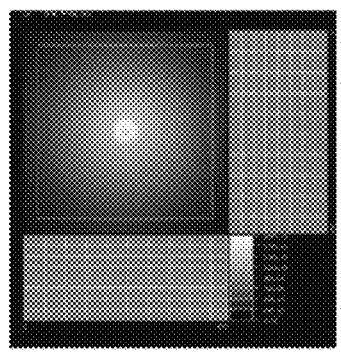
Figure 9B:
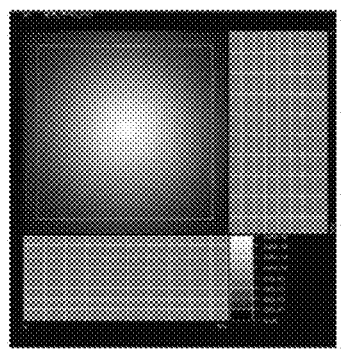
Figure 9C:
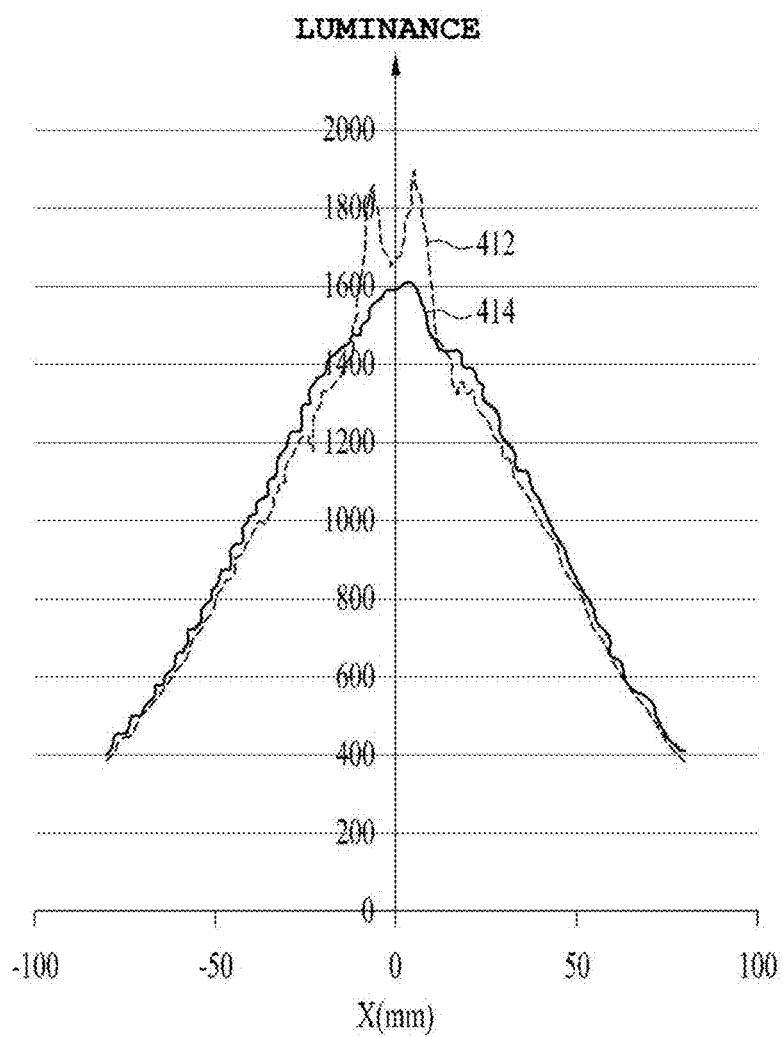
Figure 10A:
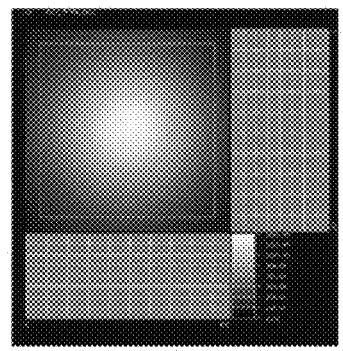
Figure 10B:
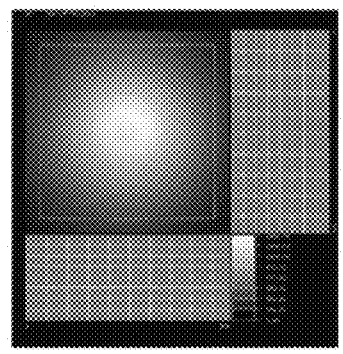
Figure 10C:
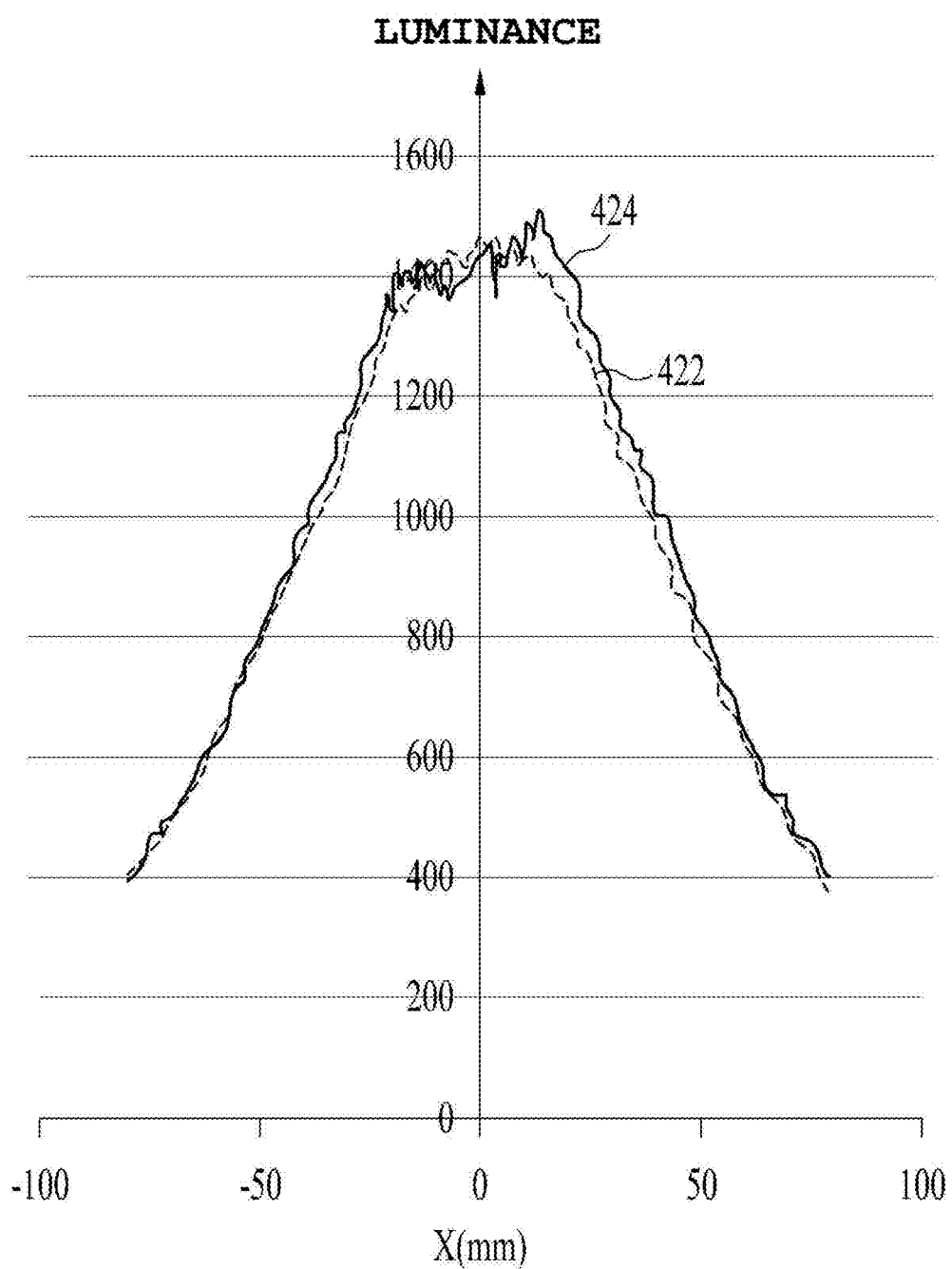

FIGS. 8A to 8C, 9A to 9C, and 10A to 10C are views showing Mura levels and luminance distributions of a light emitting apparatus according to a comparative example and a light emitting apparatus according to an embodiment under different conditions, respectively. Specifically, FIGS. 8A, 8B, and 8C are views respectively showing a Mura level of a light emitting apparatus according to a comparative example, a Mura level of a light emitting apparatus according to an embodiment, and luminance distributions of the light emitting apparatuses, which are acquired under the same first condition. FIGS. 9A, 9B, and 9C are views respectively showing a Mura level of a light emitting apparatus according to a comparative example, a Mura level of a light emitting apparatus according to an embodiment, and luminance distributions of the light emitting apparatuses, which are acquired under the same second condition. FIGS. 10A, 10B, and 10C are views respectively showing a Mura level of a light emitting apparatus according to a comparative example, a Mura level of a light emitting apparatus according to an embodiment, and luminance distributions of the light emitting apparatuses, which are acquired under the same first condition. In FIGS. 8C, 9C, and 10C, a horizontal axis indicates positions in a direction perpendicular to the light axis (i.e. an X-axis direction), and a vertical axis indicates a luminance level.

In a case in which the light emitting apparatus according to the embodiment includes a lower segment S3L, wherein the lower segment S3L has a pattern including RMS roughness, unlike the light emitting apparatus according to the comparative example, the Mura levels of the light emitting apparatus according to the comparative example shown in FIGS. 8A, 9A, and 10A may be improved as shown in FIGS. 8B, 9B, and 10B. As shown in FIGS. 8C, 9C, and 10C, luminance distributions 404, 414, and 424 of the light emitting apparatus according to the embodiment may be more uniform than luminance distributions 402, 412, and 422 of the light emitting apparatus according to the comparative example. That is, the luminance of the light emitting apparatus according to the embodiment may be normally distributed. In addition, as shown in FIGS. 9C and 10C, the luminance distributions 414, and 424 of the light emitting apparatus according to the embodiment may be wider than the luminance distributions 412 and 422 of the light emitting apparatus according to the comparative example.

Figure 11:
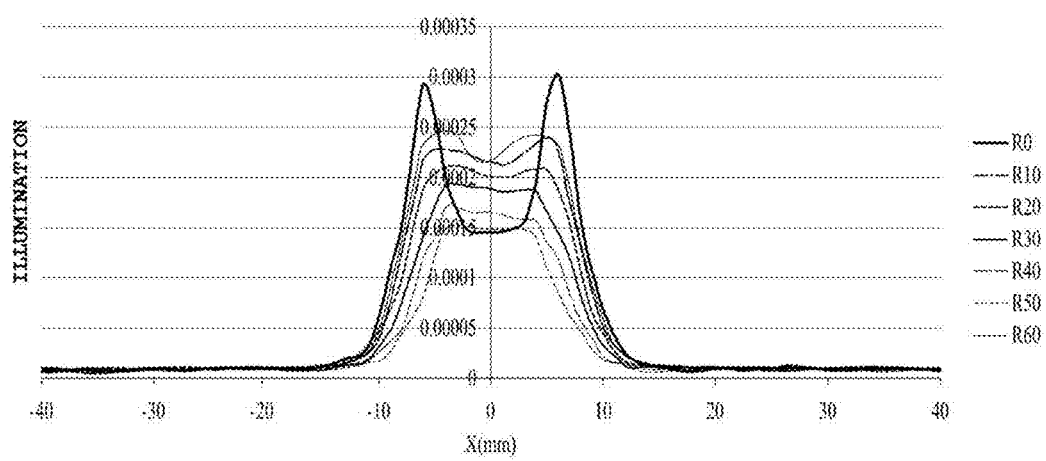
FIG. 11 is a view showing illumination distribution based on a degree of root mean square (RMS) roughness of a lower segment.
Figure 12A:
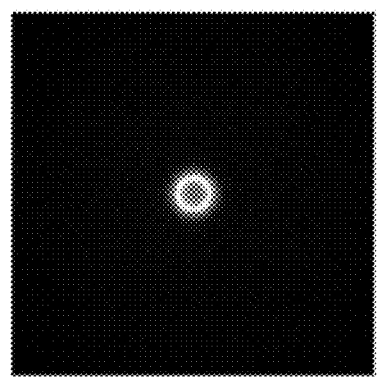
FIGS. 12A to 12G are photographs showing planar illumination in a case in which RMS micro roughness is R0, R10, R20, R30, R40, R50, and R60.
Figure 12B:
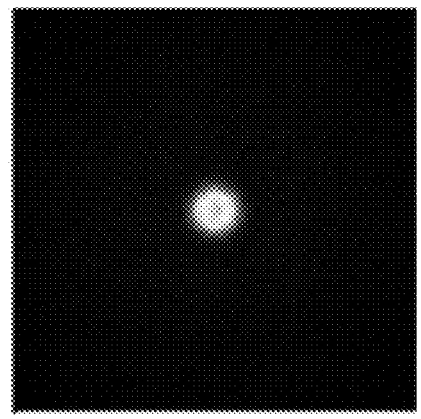
Figure 12C:
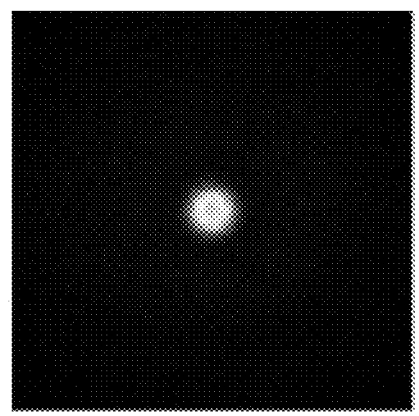
Figure 12D:
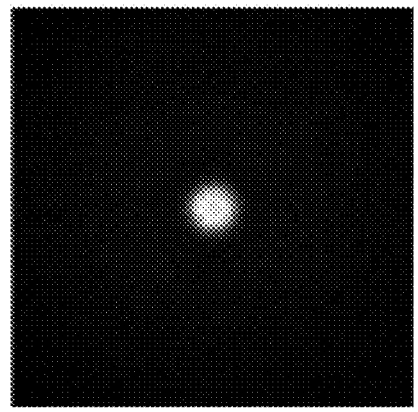
Figure 12E:
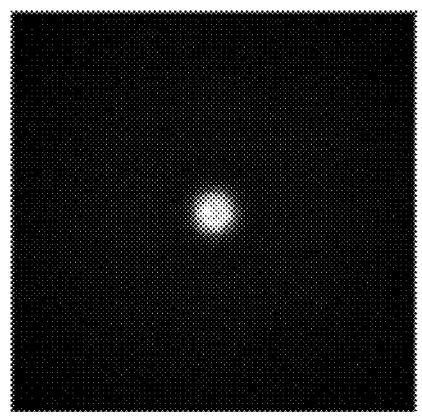
Figure 12F:
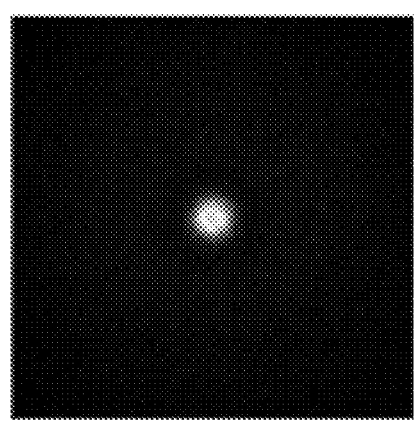
Figure 12G:
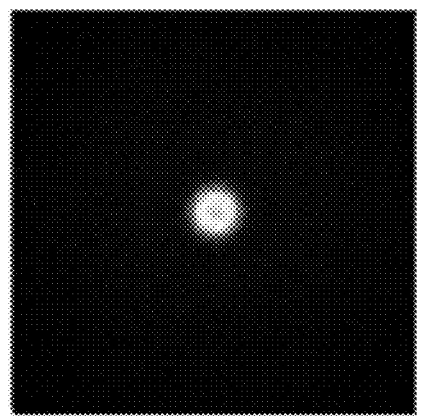

FIG. 11 is a view showing illumination distribution based on a degree of RMS roughness of the lower segment S3L. In FIG. 11, a vertical axis indicates the intensity of illumination, and a horizontal axis indicates positions in a direction perpendicular to the light axis (i.e. an X-axis direction). X=0 indicates a light axis LX. That is, the left side of the light axis LX may have negative (−) X values, and the right side of the light axis LX may have positive (+) X values. In addition, R0, R10, R20, R30, R40, R50, and R60 indicate an RMS micro roughness of 0, 10, 20, 30, 40, 50, and 60, respectively.

FIGS. 12A to 12G are photographs showing planar illumination in a case in which the RMS micro roughness is R0, R10, R20, R30, R40, R50, and R60, respectively.

Referring to FIGS. 11 and 12A to 12G, it is known the illumination distribution may become uniform as the RMS micro roughness increases. This is because much more light is scattered by the lower segment S3L as the RMS micro roughness of the lower segment S3L increases.

In the lens 130A or 130B according to the embodiment, the lateral surface includes a plurality of segments inclined at different angles, and at least one of the segments has a pattern such as RMS roughness. As a result, light may be scattered. Consequently, light may exit from the lens 130A or 130B along an increased number of paths. That is, a light exit path may include a third path LP3 in addition to first and second paths LP1 and LP2. Consequently, light may be uniformly spread from the lens 130A or 130B. As a result, the size of the lens 130A or 130B may be reduced, whereby the cost of manufacturing the lens 130A or 130B may be reduced. In addition, wider illumination may be provided while a given number of LEDs are used. Furthermore, in a case in which the light emitting apparatus 100A or 100B, in which the lens 130A or 130B is used, is applied to the backlight unit 200, the cost of manufacturing the backlight unit 200 may be reduced, power consumption may be reduced, and the backlight unit 200 may be slimmed.

As is apparent from the above description, in a lens according to an embodiment, a light emitting apparatus including the lens, and a backlight unit including the light emitting apparatus, a lateral surface of the lens includes a plurality of segments, wherein at least one of the segments has a pattern such as RMS roughness, whereby the number of light paths is increased. Consequently, light may be uniformly spread from the lens. As a result, the size of the lens may be reduced, whereby the cost of manufacturing the lens may be reduced. In addition, wider illumination may be provided although a small number of LEDs are used. Furthermore, in a case in which a light emitting apparatus, in which the lens is used, is applied to a backlight unit, the cost of manufacturing the backlight unit may be reduced, power consumption may be reduced, and the backlight unit may be slimmed.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A light emitting apparatus, comprising:
a light source on a base;
a lens located on the light source; and
a support member having a circular shape and attached to the lens to support the lens on the base,
wherein the lens comprises:
an upper surface;
a lower surface located under the upper surface such that the lower surface is opposite to the light source; and
a lateral surface between the upper surface and the lower surface, wherein the lateral surface comprises a plurality of segments inclined at different angles with respect to the lower surface, at least one of the segments having a pattern, the pattern having a plurality of holes and a plurality of rods, the holes and rods being formed to have a roughness configured to facilitate scattering of light from the light source, and
wherein the support member is attached to the lower surface of the lens by an adhesive to totally surround the light source.

2. The light emitting apparatus according to claim 1, wherein a lower segment of the segments is connected to the lower surface and has the roughness larger than 0 μm and smaller than 60 μm.

3. The light emitting apparatus according to claim 1, wherein the holes and the rods are periodically arranged.

4. The light emitting apparatus according to claim 1, wherein the holes and the rods are non-periodically arranged.

5. The light emitting apparatus according to claim 1, wherein the upper surface has a recess that is recessed toward the light source.

6. The light emitting apparatus according to claim 1, wherein each of the segments has a width gradually increasing from the lower surface to the upper surface.

7. The light emitting apparatus according to claim 1, wherein one segment of the segments close to the lower surface has a width smaller than that of another segment of the segments close to the upper surface.

8. The light emitting apparatus according to claim 1, wherein one segment of the segments close to the lower surface has an angle of inclination that is less than that of another segment of the segments close to the upper surface.

9. The light emitting apparatus according to claim 1, wherein one segment of the segments close to the lower surface has an angle of inclination that is greater than that of another segment of the segments close to the upper surface.

10. The light emitting apparatus according to claim 1, wherein one segment of the segments close to the lower surface has the roughness larger than that of another segment of the segments close to the upper surface.

11. The light emitting apparatus according to claim 1, wherein the lower surface of the lens has an incident surface for allowing light emitted from the light source to be incident thereupon, the upper surface of the lens has a reflective surface for reflecting the light incident upon the incident surface, and one segment of the segments close to the lower surface has a scattering surface for scattering the light reflected by the reflective surface.

12. The light emitting apparatus according to claim 1, wherein the lens is symmetric with respect to a light axis.

13. The light emitting apparatus according to claim 1, wherein the lens is asymmetric with respect to a light axis.

14. The light emitting apparatus according to claim 1, wherein the segments comprise:
a lower segment extending from the lower surface toward the upper surface in a state of being inclined; and
an upper segment extending from the lower segment toward the upper surface in a state of being inclined.

15. The light emitting apparatus according to claim 14, wherein at least one of the lower and upper segments is straight.

16. The light emitting apparatus according to claim 14, wherein at least one of the lower and upper segments is curved.

17. The light emitting apparatus according to claim 1, further comprising a cover located on the lens.

18. The light emitting apparatus according to claim 17, wherein the cover comprises at least one selected from among:
a transmission plate transmitting at least some of light exiting from the lens;
a reflection plate reflecting at least some of light exiting from the lens; and
a diffusion plate diffusing at least some of light exiting from the lens.

19. A backlight unit, comprising:
a bottom chassis;
a reflection member located on the bottom chassis;
at least one light emitting apparatus according to claim 1, the light emitting apparatus being located on the reflection member; and an optical sheet located on the light emitting apparatus in a state of being supported by the bottom chassis.

20. A lens, comprising:

an upper surface;

lower surface located under the upper surface such that the lower surface is opposite to a light source;

a lateral surface between the upper surface and the lower surface; and a support member having a circular shape and attached to the lower surface by an adhesive to totally surround the light source, wherein the lateral surface comprises a plurality of segments inclined at different angles with respect to the lower surface, at least one of the segments having a pattern, the pattern having a plurality of holes and a plurality of rods, the holes and rods being formed to have a roughness configured to facilitate scattering of light from the light source, and wherein each of the segments has a width gradually increasing from the lower surface to the upper surface.

* * * * *